United States Patent [19]
Luce et al.

[11] Patent Number: 5,199,634
[45] Date of Patent: Apr. 6, 1993

[54] STORAGE CONTAINER WITH DISPOSABLE LID

[76] Inventors: Barry R. Luce, 275 Ron Allen Drive, Dorchester, Ontario N0L 1G1; Danny P. St. Dennis, 550 Charlotte Street, Windsor, Ontario N8X 3A3; Clifford E. J. Charbonneau, 300 Crownridge Blvd., Amherstburg, Ontario N9V 3W8, all of Canada

[21] Appl. No.: 901,074
[22] Filed: Jun. 19, 1992
[51] Int. Cl.⁵ .............................. B65D 43/02
[52] U.S. Cl. .................... 229/125.29; 229/117.16; 229/125.26; 229/125.27
[58] Field of Search ............ 229/117.16, 125.25, 229/125.26, 125.27, 125.28, 125.29

[56] References Cited

U.S. PATENT DOCUMENTS

| | | | |
|---|---|---|---|
| 2,711,282 | 6/1955 | D'Esposito | 229/125.29 |
| 3,010,638 | 11/1961 | Forrer | 229/125.29 |
| 3,116,007 | 12/1963 | D'Esposito et al. | 229/125.26 |
| 3,193,174 | 7/1965 | Glasband et al. | 229/125.29 |
| 3,195,798 | 7/1965 | Wilson | 229/125.27 |
| 3,410,475 | 11/1968 | Wagner | 229/125.29 |
| 4,018,378 | 4/1977 | Persson | 229/125.26 |
| 4,114,798 | 9/1978 | Gardner | 229/125.26 |

Primary Examiner—Gary E. Elkins
Attorney, Agent, or Firm—Samuels, Gauthier & Stevens

[57] ABSTRACT

An interlocking container and lid combination is disclosed for storage of bottles and the like. The interlocking combination includes a reusable rectangular container provided with an integral lip along the upper edge of the container sides. A flap integrally formed with and extending vertically down from the lip at each end of the container and having a slot therein forms handles. A lid, preferably made of cardboard, includes a central portion and opposed side flaps foldable with respect to the central portion along fold lines. Each end of the flaps are extended by tabs which are spaced a distance slightly greater than the width of the lip. The opposed ends of the lid are extended by end flaps integrally formed with, and bendable with respect to, the central portion along fold lines. The slots in the lid flaps are in registration with the slots in the container handles when the lid is secured to the container. The end flaps include tabs extending the opposed sides. The lid is locked on the container by folding the flaps down over the lip and overlapping and gluing the side and end tabs together at the corners so that the four side tabs are locked under the lip at the corners. The lid is removed from the container by pulling outwardly on the end flaps to tear the tabs and the lid discarded.

23 Claims, 9 Drawing Sheets

STORAGE CONTAINER WITH DISPOSABLE LID

FIELD OF THE INVENTION

The present invention relates to storage containers for beer and the like and more particularly to storage containers having disposable lids.

BACKGROUND OF THE INVENTION

The need for interlocking containers and lids for bottles and cans is well known. Cardboard containers with integrally formed lid flaps are well known in the art. A drawback to such containers is the very limited lifetime due to ripping, tearing or puncturing of the containers. Therefore such containers are not readily reusable but must generally be discarded after one use. This imposes both an economic and environmental burden, the economic burden being related to the costs involved in having to constantly fabricate full cardboard containers. The environmental burden stems from the fact that a significant fraction of the waste currently being disposed of in landfill sites comprises packaging of some sort or another.

Accordingly, it would be desirable to provide a bottle or can container and lid combination utilizing a locking mechanism which permits the use of dissimilar materials for the fabrication of the container and lid portions whereby the container can be reused on a regular basis and the lid can be readily discarded.

SUMMARY OF THE INVENTION

The subject invention provides an interlocking container and lid combination for storing bottles and the like. In one aspect of the invention there is provided a rigid container having with a bottom and container side wall defining an interior. The side wall has an upper edge forming a container upper edge with container upper edge defining a top opening for providing access into the interior of the rigid container. The rigid container includes rigid lip means having a lower edge, the lip being located along at least a portion of the upper edge of the rigid container. There is provided a lid having a central portion dimensioned to cover the top opening. A plurality of spaced pairs of tab members are attached to the central portion with the tab members of each of the plurality of spaced pairs being shaped and dimensioned so that when the lid is received onto the rigid container the two tab members of each of the plurality of spaced pairs are overlappable and attachable to each other beneath the rigid lip means to abut the lower edge of the lip means to lock the lid to the rigid container.

In another aspect of the invention, there is provided a rigid, generally rectangular container having a bottom and side walls defining an interior. The side walls each have an upper edge forming a container upper edge with the container upper edge defining a top opening for providing access into the interior of the rigid container. The rigid container includes means defining a lip located at the corners of the container along the upper edge of the rigid container. There is provided a lid having a generally rectangular central portion with side edges and corners. Flap members are attached to each side edge and are integrally formed with and foldable with respect to the central portion. Each flap member has opposed end edges spaced from the corners of the lid and a tab extends from each end edge of the flap. The tabs are dimensioned so that when the lid is received onto the rigid container there are two tabs located adjacent to each corner which are opposed and overlappable and are attachable to each other below the lip means to lock the lid to the rigid container.

In a further aspect of the invention, a combination rectangular container and lid is provided. The lid is formed from a rectangular blank. The container is rigid and provided with a bottom and side walls defining a container interior. The side walls have an upper edge forming a container upper edge which defines a top opening for providing access into the container interior. The container includes a rigid lip member located along at least a portion of the upper edge of the container. The lid blank is dimensioned to cover the top opening. The improvement comprises the lid blank having a central portion with side edges and corners. The lid blank includes integrally formed side flap members extending along the side edges with the flap members being bendable with respect to the central portion. The flap members have end edges spaced from the corners of the central portion and the flap members include tabs extending from each end edge to provide a pair of tabs located adjacent each corner. The tabs are dimensioned so that the tabs of each pair of tabs located adjacent to each corner are opposed and overlappable and attachable to each other below the rigid lip member for locking the lid to the container.

In a further aspect of the invention, a combination rectangular container and lid is provided. The lid is formed from a rectangular blank and the combination is of the type wherein the container is provided with a bottom and side walls with the side walls having an upper edge defining a top opening for providing access into the interior of said container. The container includes mean defining a lip located along at least a portion of the upper edge of the container. The lid blank is dimensioned to cover the top opening. The improvement comprises the lid blank having a central portion with side edges and corners, the lid blank including integrally formed side flap members extending along the side edges. The flap members are bendable with respect to the central portion, the flap members having end edges spaced from the corners of the central portion. The flap members include tabs extending from each end edge with the tabs being dimensioned so that the tabs located adjacent to each corner are opposed and overlappable and attachable to each other below the lip member for locking the lid to the container.

BRIEF DESCRIPTION OF THE DRAWINGS

The following is a description, by way of example only, of various embodiments of the combination storage container and disposable lid forming the subject invention reference being had to the accompanying drawings, in which.

DETAILED DESCRIPTION OF THE INVENTION

Figure 1:
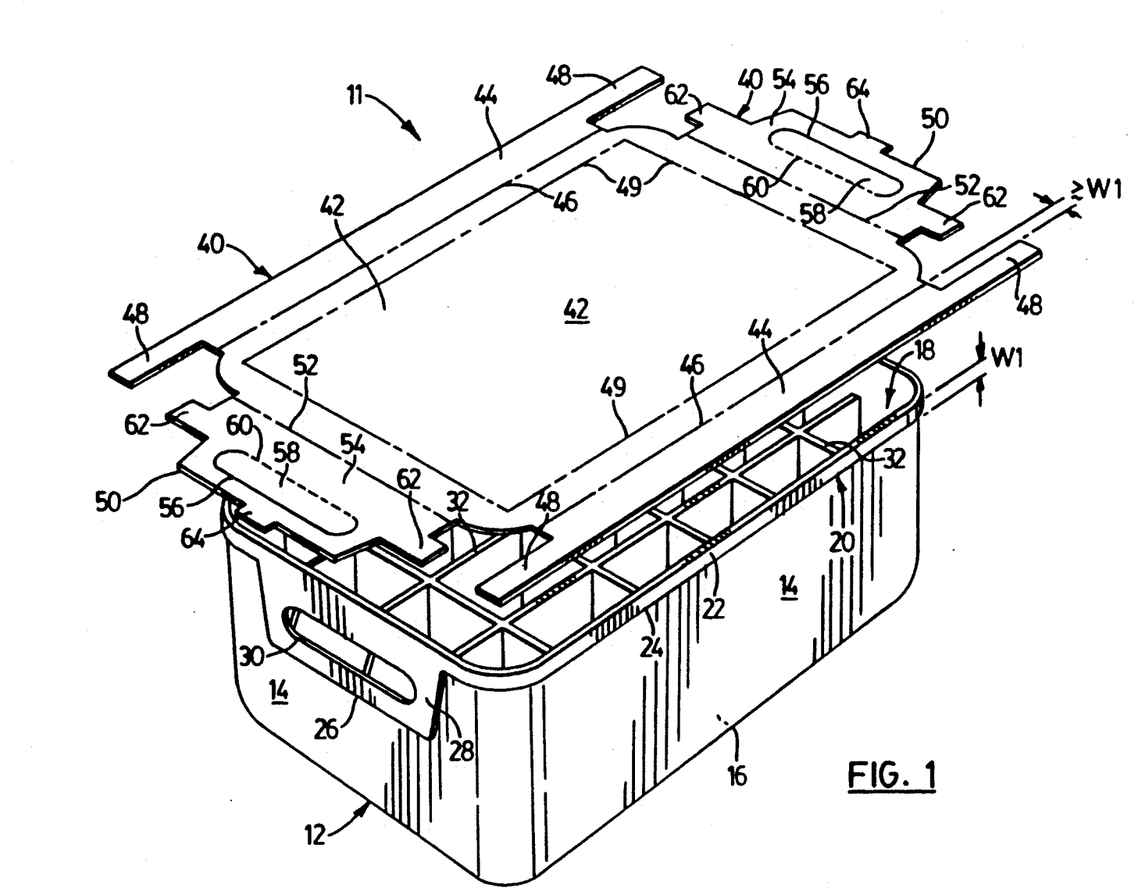
FIG. 1 is a perspective view of a container and a blank of a disposable lid for the carton forming the subject invention.

In the ensuing description of the structure and operation of the container and lid of the subject invention, reference will be made to the Figures wherein like numerals refer to like parts. Referring first to FIG. 1, a combination container and lid indicated by numeral 11 includes a rectangular container 12 having sides 14 and a bottom 16. Container 12 has a top opening 18 for adding to and removing objects from container 12. Container 12 includes a lip 20 integral with or attached to the upper edge of sides 14 adjacent to top opening 18 and which extends fully around opening 18. In the embodiment shown, lip 20 has an inverted L-shape and includes a portion 22 which is substantially parallel to sides 14 which has a width W1 and a lower edge 24. The purpose of lip 20 will be discussed presently. A pair of opposed hand grip portions 26 are provided on opposed sides of container 12 so that the container can be readily picked up by a user. Handgrips 26 each include a flap 28 integrally formed with and extending substantially vertically downwards from lip 20. Flap 28 includes an elongate slot 30 dimensioned to receive therein the hand of a user. Container 12 is preferably fabricated of a plastic material, and more preferably of a reusable plastic material and may be produced using any one of several known plastic fabrication techniques. Handgrip portions 26 and lip 20 are preferably integrally formed with sides 14 at the time of fabrication of container 12.

In one application, the container and lid at 11 may be used for storing and transporting cans, and glass bottles such a beer bottles and the like, not shown. For such applications, container 12 is provided with a spacer insert 32 which is sized to fit snugly within container 12. The presence of spacer 32 within container 12 acts to keep bottles stored therein separate from each other thereby preventing breakage.

The combination container and lid shown in FIG. 1 includes a lid 40 which is shown as a lid blank prior to being assembled into a lid. Lid 40 includes a generally planar central top portion 42 and two integral side flaps 44 joined to central portion 42 along fold lines 46. Each side flap 44 is provided with an end tab 48 extending from each end edge of flap 44 and spaced a distance from fold line 46 just slightly greater than width W1. Lid 40 includes a pair of opposed handgrip portions 50 integrally formed with central portion 42 and joined therewith one at each opposed end thereof along fold lines 52. Handgrip portions 50 are each provided with flaps 54 having elongate slots 56 dimensioned to receive therein the hand of a user. In one embodiment of lid 40, a cover 58 is integrally attached to flap 54 along an elongate edge of slot 56, indicated by fold line 60, along which cover 58 hinges when pressed inwardly. The dimensions of flaps 54 are such that when lid 40 is secured to container 12, slots 30 are in registration with slots 56 s that a user may grip the lid 40 and container 12 by inserting his or her hands through the registered slots on each end of the container. Each flap 54 is provided with a pair of integrally formed tabs 62 each extending outwardly from the side edges of the flap. Tabs 62 are spaced a from fold lines 52 distance just slightly greater than width W1. Flaps 54 also each include an integrally formed tear tab 64 which extends the outer end of the flap and is symmetrically positioned centrally with respect to slot 56. Lid 40 is preferably made from a cardboard material such as corrugate which is of sturdy construction and which is suitable to have matter printed on the outer surface thereof for advertising purposes and the like.

Lid 40 is provided with a set of fold lines 49 spaced inwardly from score lines 46 and 52 which define a rectangle.

Figure 2:
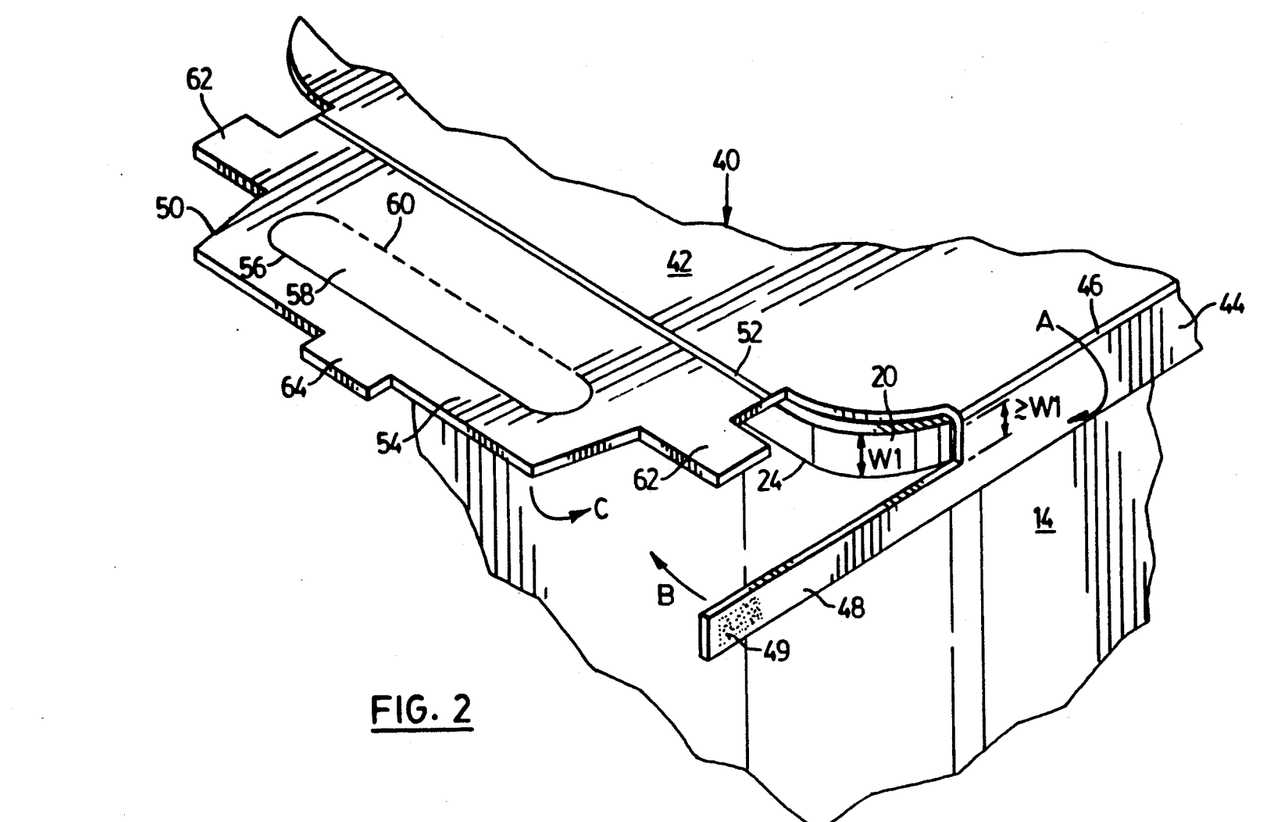
FIG. 2 illustrates the cardboard blank of the disposable lid of FIG. 1, broken away, partially assembled on the container.
Figure 3:
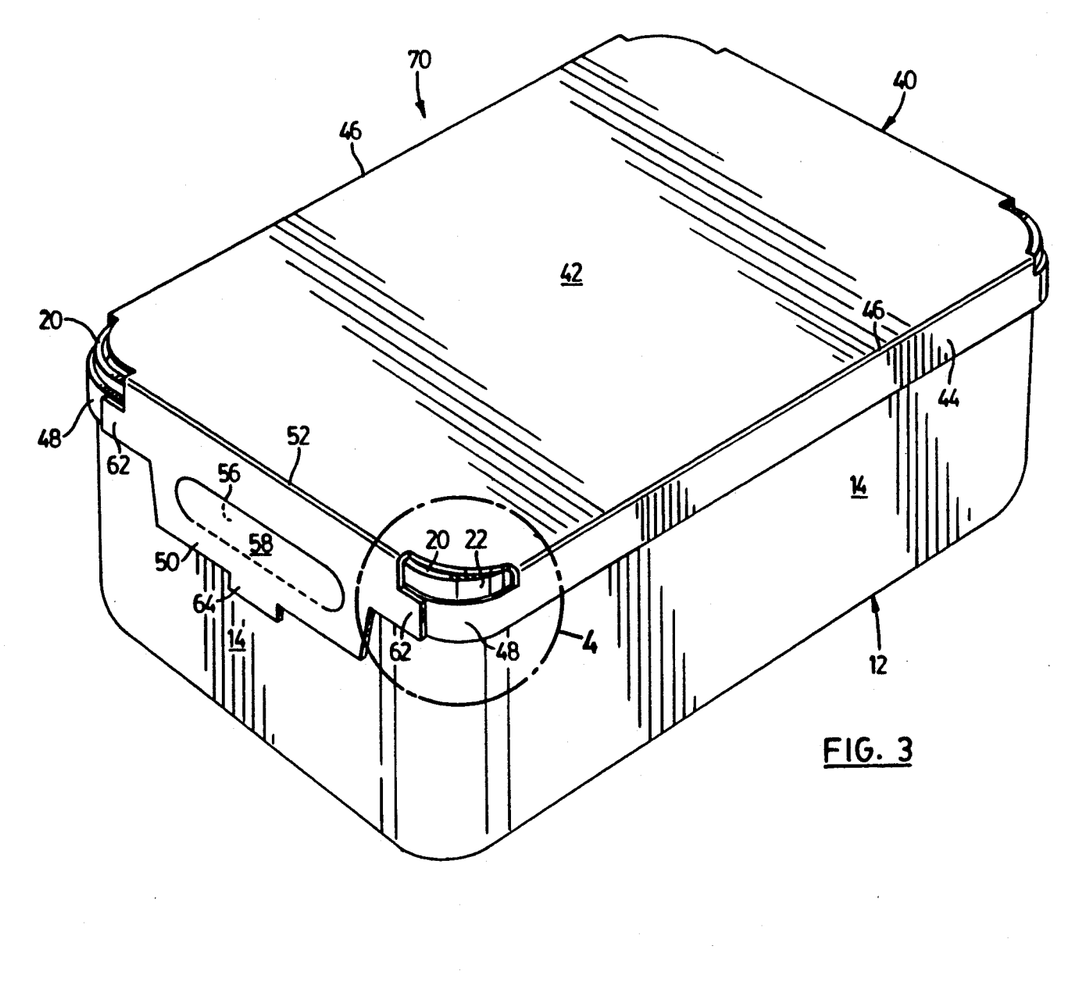
FIG. 3 is a perspective view illustrating the cardboard lid of FIG. 2 fully assembled in locking engagement on the container.
Figure 4:
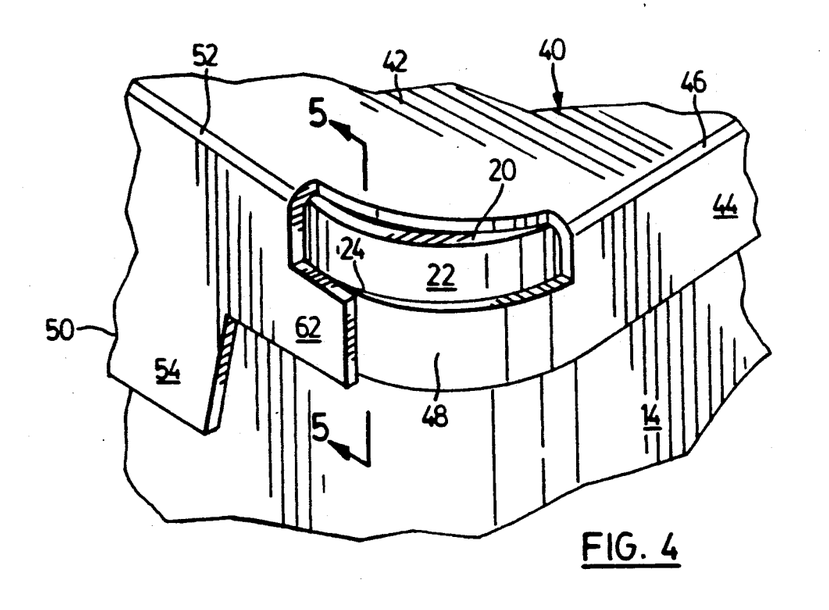
FIG. 4 is a more detailed view of the encircled portion 4 of FIG. 3.
Figure 5:
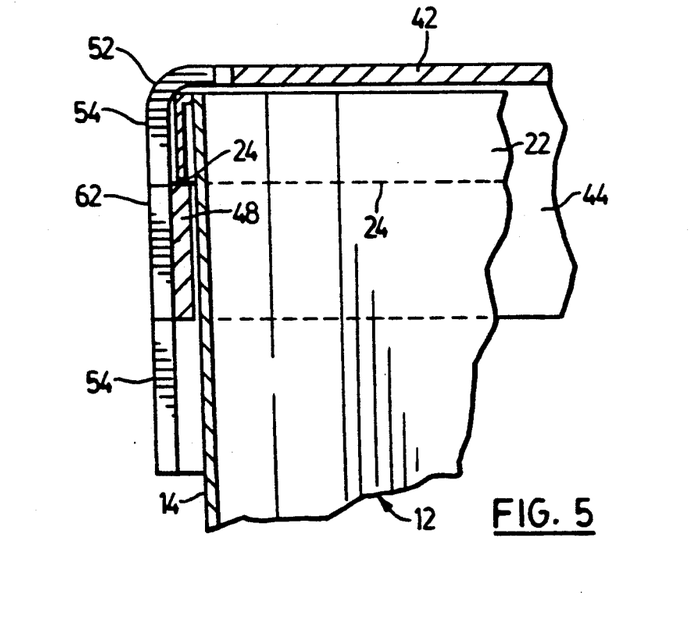
FIG. 5 is a sectional view taken along the line 5—5 of FIG. 4.

Referring to FIGS. 2 to 5, in operation lid 40 is secured to container 12 after the container has been loaded with the bottles or objects being stored therein. Once container 12 has been loaded, the blank of the lid 40 is placed onto the top of the container and side flaps 44 are folded downwards over lip portion 22 of the container along fold lines 46 in the direction of arrow A. Tabs 48, which have had a coat of glue 49 applied to the outer face of the tab adjacent the free end thereof, as best seen in FIG. 2, are folded inwardly toward container 12 in the direction of arrow B. Flaps 54 of lid 40 are folded downwardly over flaps 28 in the direction of arrow C and the inner surfaces of tabs 62 are glued to the outer surfaces of tabs 48 by glue coating 49 so that a portion of tab 48 adjacent to tab 62 is secured just below lower edge 24 of the vertical portion 22 of lip 20. The assembled lid and container is shown at 70 in FIG. 3. When the four tabs 48 are glued to the four tabs 62 of lid 40 with tabs 48 positioned below the lower edge 24 of lip portion 22, lid 40 is secured to container 12. The details of the connection of the lid to the container are best seen in FIGS. 4 and 5. With slots 30 in registration with slots 56 there is provided a means for a user to grip and pick up the container.

It will be appreciated by those skilled in the art that the gluing operation to secure lid 40 to container 12 will in general be fully automated such as in an assembly line operation after the container 12 has been loaded. Other methods of attaching the tabs together at the corners of the lid will be apparent to those skilled in the art, including stapling or using Velcro (a trademark) pieces attached to the cardboard tabs.

Once the assembled lid and container with enclosed contents has been delivered to the desired location, lid 40 is removed from container 12 by gripping tear tab 64 and pulling outwardly thereby pulling on flap 54 which acts to tear on or both cardboard tabs 48 and 62 or both. Lid 40 may be stored in and returned with container 12 by folding the lid along fold lines 49 and placing it into empty container 12. Alternatively, cardboard lid 40 may then be disposed of directly, preferably by recycling. After container 12 ha been used it may be returned to the source along with the empty bottles and the used lid. Ultimately, container 12 may be reused by being refilled with fresh bottles and refitted with a new lid 40.

Figure 6:
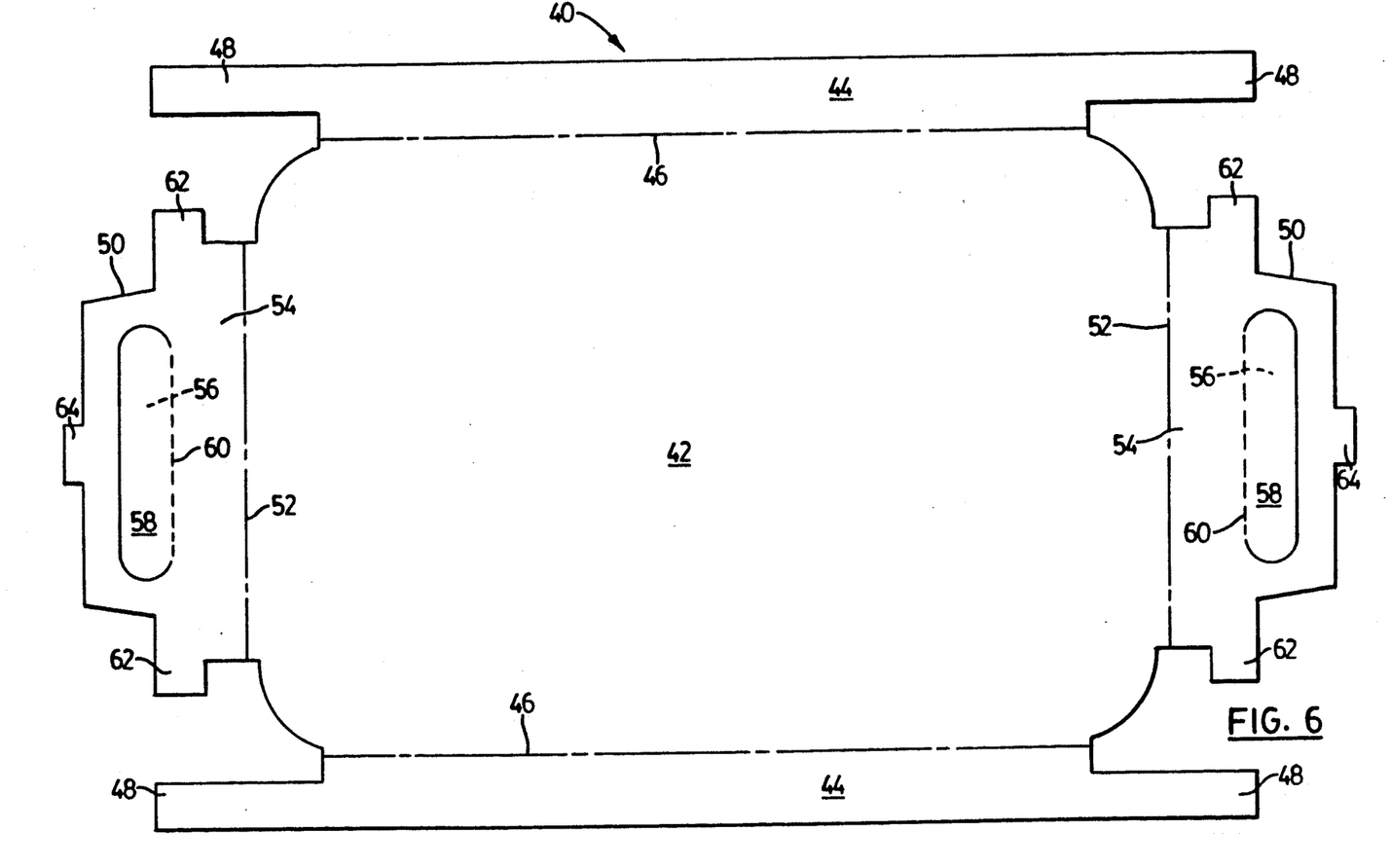
FIG. 6 is a top view of the cardboard blank shown in FIG. 1.
Figure 7A:
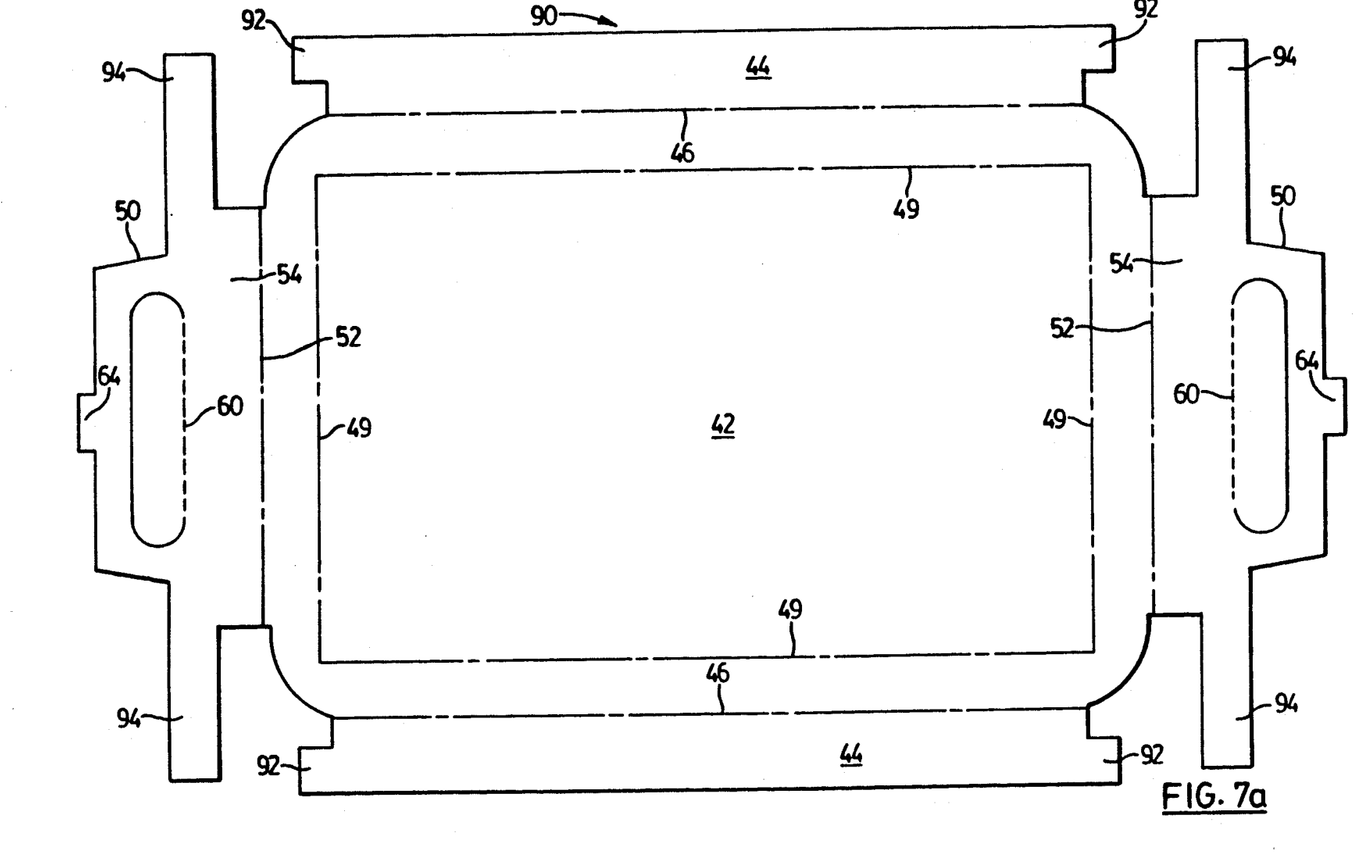
FIGS. 7a and 7b show top views of two further embodiments of a cardboard blank of a container lid.

Referring now to FIG. 7a, a slightly different embodiment of lid blank is shown a 90 respectively. The only difference between the two embodiments shown in FIGS. 6 and 7a is that lid 90 employs tabs 92 extending flaps 44 which are shorter than tabs 94 extending from flaps 54, these relative dimensions being the reverse of the situation with lid 40 shown in FIGS. 6.

Since the interlocking connection between lid 40 and container 12 is formed by a portion of the four tabs 48 being locked under the edges 24 of lip 20 at the corners, it will be appreciated that container 12 may be fabricated with outwardly extending lip portions at the corner only.

Figure 8:
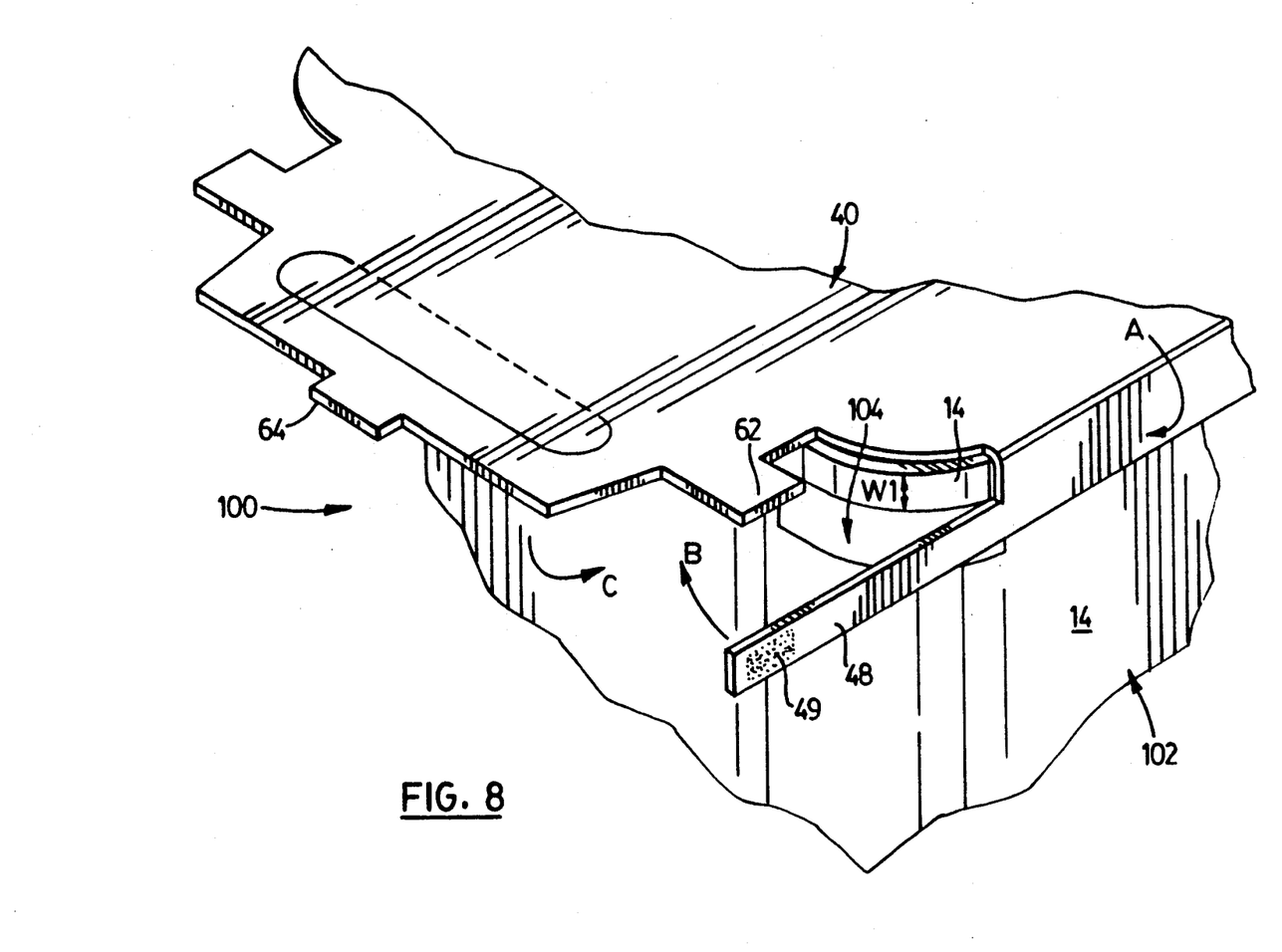
FIG. 8 is a view, similar to FIG. 2, of an alternative embodiment of a combination container and lid embodying the subject invention.
Figure 9:
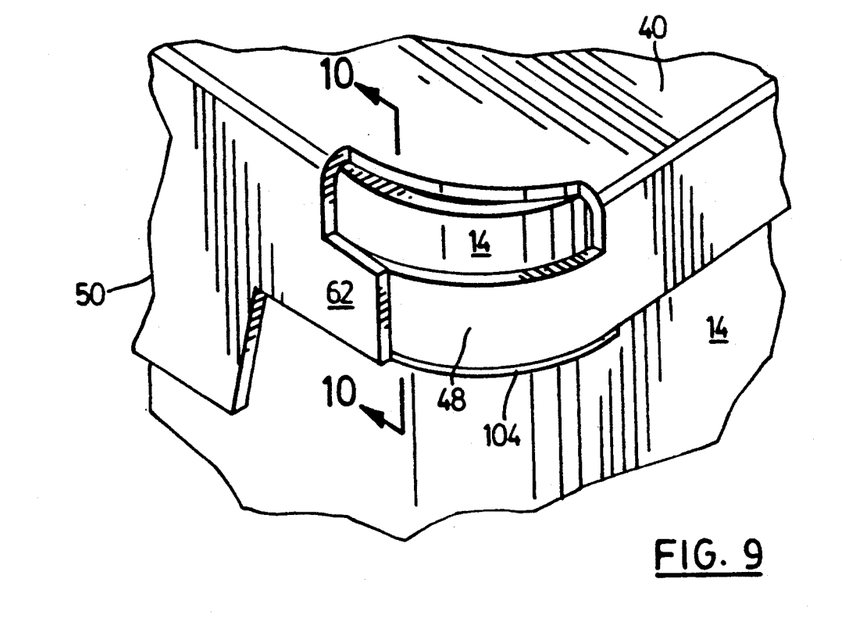
FIG. 9 is a detailed view of the embodiment of FIG. 8, broken away, showing the lid attached to the container.
Figure 10:
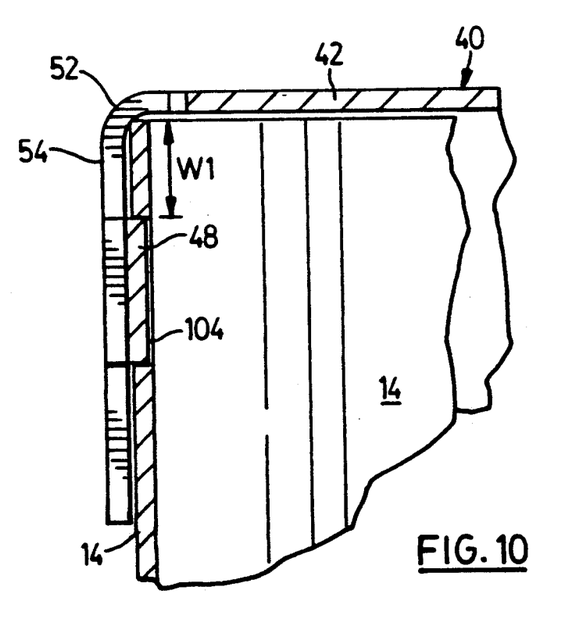
FIG. 10 is a sectional view taken along the line 10—10 of FIG. 9.

FIGS. 8-10 illustrate another container and lid combination 100 embodying the subject invention. Specifically, a rectangular container 102 is provided and has slots 104 located at the corners of the container. The upper edge of slots 104 are spaced a width W1 below the upper edge of sides 14. Lid 40 may be secured to container 102 in the same way as described in the embodiment shown in FIGS. 1 to 5 except that tabs 62 and 48 are attached together in such a way that there is a portion of tab 48 located in each of slots 104 thereby preventing lid 40 from being lifted off container 102. Lid 40 is removed in the same way as the previous embodiment by pulling outwardly on end flaps 54 thereby tearing the tabs so that the lid can be disengaged from the container. In this embodiment peripheral lip 20 of the previous embodiment around the upper edge of the container walls may be discarded.

Figure 7B:
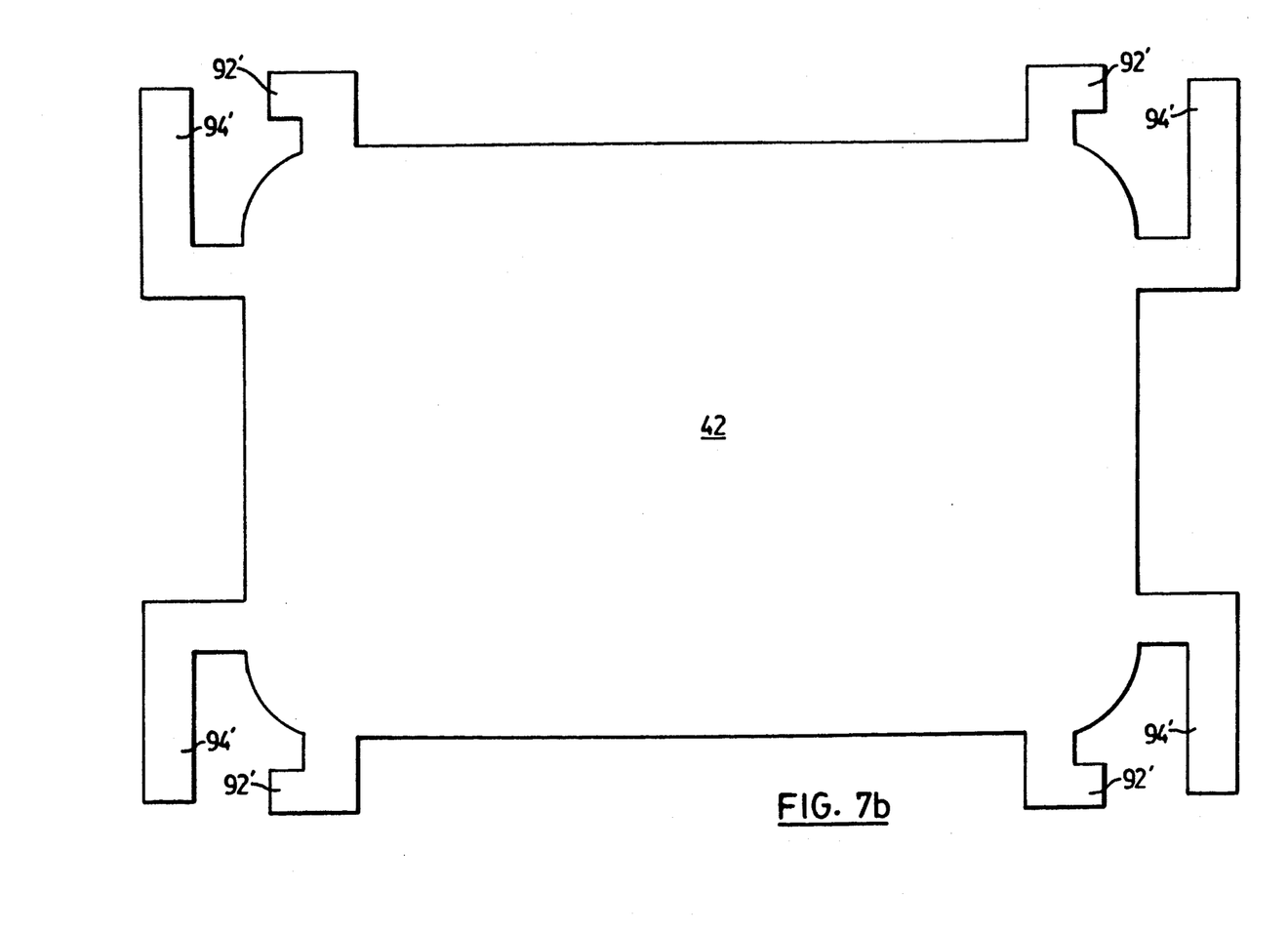

While the container and lid disclosed and illustrated herein is rectangular, it will be appreciated that cylindrical containers with generally circular lids may also be employed. In such an embodiment there may be a plurality of pairs of L-shaped tab members disposed about the peripheral edge of the lid central portion and extending outwardly and bent downwardly therefrom. In other words, the portion of flap 44 between the tabs could be absent leaving only a connecting portion, thereby defining an L-shaped tab member. The tab members of each pair would be dimensioned to overlap each other when bent in the same transverse direction with respect to the central portion of the lid. The cylindrical container would include a plurality of spaced lip portions spaced around the upper edge of the container and dimensioned so that when the tabs of each pair are overlapped and attached below the lip portion, the lid is secured to the container. The above mentioned L-shaped tab members could also be used with rectangular containers and lids, thereby dispensing with flaps 44, see FIG. 7b.

The disposable cardboard lid and plastic reusable container provide a convenient and aesthetically pleasing combination, which, because a new lid is provided every time container 12 is refilled, always has a fresh appearance.

The combination of the reusable container and recyclable lid disclosed herein cuts down considerably the amount of waste material normally accompanying beer or bottle packaging.

While the interlocking container and lid of the present invention has been described and illustrated with respect to the preferred and alternative embodiments, it will be appreciated that numerous variations of these embodiments may be made without departing from the scope of the invention disclosed herein.

Therefore what is claimed is:

1. An interlocking container and lid, comprising;
   a) a rigid container provided with a bottom and container side wall defining an interior, the side wall having an upper edge forming a container upper edge, said container upper edge defining a top opening for providing access into said interior of said rigid container, the rigid container including outwardly protruding rigid lip means having a lower edge, the lip means being located along at least a portion of the upper edge of the rigid container; and
   b) a lid having a central portion dimensioned to cover said top opening, a plurality of spaced pairs of tab members attached to said central portion, the tab members of each of said plurality of spaced pairs being shaped and dimensioned so that when the lid is received onto the rigid container the two tab members of each of said plurality of spaced pairs are overlappable and attachable to each other beneath said rigid lip means to abut said lip lower edge to lock said lid to said rigid container.

2. The interlocking container and lid according to claim 1 wherein said rigid container and lid are generally rectangular each having four corners, said rigid lip means extending around the corners of the rigid container, wherein said plurality of spaced pairs of tab members includes a pair of tabs located adjacent to each corner of the lid, each tab of said pair of tabs being attached to adjacent sides of the lid.

3. The interlocking container and lid according to claim 2 wherein the rigid container is provided with a slot at each corner extending into each side wall, each said slot being spaced below said upper edge of said rigid container, said rigid lip means at each particular corner being defined by a portion of the side walls between the slot and the upper edge of said side walls at that particular corner, wherein when the lid is received on the rigid container a portion of the overlappable tabs of each tab pair are receivable in a slot.

4. The interlocking container and lid according to claim 2 wherein said rigid lip means comprises an inverted L-shaped lip member integrally formed with said side walls and extending along said upper edge of said container at the corners thereof, a first arm of said inverted L-shaped member extending perpendicularly to said side wall and a second arm extending parallel to said side wall, the first arm having a predetermined width, said pairs of tab members comprising pairs of L-shaped tabs, each tab having a first arm integrally attached at one end thereof to said central portion of the lid and a second arm extending from the other end of the first arm, the second arms of said tabs of each pair of tabs extending towards and overlappable with each other.

5. The interlocking container and lid according to claim 4 wherein said inverted L-shaped lip member extends continuously along the upper edge of said rigid container.

6. The interlocking container and lid according to claim 5 wherein said rigid container is moulded from a suitable plastic material.

7. The interlocking container and lid according to claim 6 wherein said rigid container includes handle means for gripping said rigid container.

8. The interlocking container and lid according to claim 5 wherein said lid is fabricated from cardboard.

9. The interlocking container and lid according to claim 5 wherein said overlappable tab members are attachable together by gluing.

10. The interlocking container and lid according to claim 5 wherein said overlappable tabs are attachable together by stapling.

11. An interlocking container and lid, comprising:
   a) a, rigid, generally rectangular container having a bottom and side walls defining an interior, the side walls each having an upper edge forming a container upper edge, said container upper edge defining a top opening for providing access into the interior of said rigid container, the rigid container including means defining a lip located at the corners of the container along said upper edge of said rigid container; and
   b) a lid having a generally rectangular central portion with side edges and corners, including a flap member attached to each side edge, each flap member integrally formed with and foldable with respect to said central portion, each flap member having opposed end edges spaced from the corners of the lid, a tab extending from each end edge of said flap, the tabs being dimensioned so that when the lid is received onto the rigid container there are two tabs located adjacent to each corner which are opposed and are overlappable and are attachable to each other below said lip means to lock said lid to said rigid container.

12. The interlocking container and lid according to claim 11 wherein two of the side walls are opposed first and second side walls, including first and second flaps, the first flap being attached to and extending downwardly from the upper edge of the first side wall and the second flap being attached to and extending downwardly from the upper edge of the second side wall, each container flap provided with a slot located therein, said slots dimensioned to receive therein a hand of a user for lifting said container.

13. The interlocking container and lid according to claim 12 wherein two of said side flap members on opposed side edges are each provided with a slot, said slots dimensioned to receive therein a hand of a user, said slots in said side flap members being in registration with the slots in said container flaps.

14. The interlocking container and lid according to claim 12 wherein said rigid container is moulded from a suitable plastic.

15. The interlocking container and lid according to claim 13 wherein said two opposed flap members are provided each with an integrally formed tear tab, said tear tabs extending a free end of the associated flap, said tear tabs being for providing a grip for pulling said flaps outwardly for removing said lid from said container.

16. The interlocking container and lid according to claim 15 wherein said lid is fabricated from cardboard.

17. In a combination rectangular container and lid, the lid being formed from a rectangular blank, the container being rigid and provided with a bottom and side walls defining a container interior, the side walls having an upper edge forming a container upper edge which defines a top opening for providing access into the container interior, the container including means defining a rigid lip member located along at least a portion of the upper edge of the container, the lid blank being dimensioned to cover said top opening, wherein the improvement comprises;
   the lid blank having a central portion with side edges and corners, the lid blank including integrally formed side flap members extending along said side edges, the flap members being bendable with respect to the central portion, the flap members having end edges spaced from the corners of the central portion, said flap members including tabs extending from each end edge to provide a pair of tabs located adjacent each corner, the tabs being dimensioned so that the tabs of each pair of tabs located adjacent to each corner are opposed and overlappable and attachable to each other below said rigid lip member for locking said lid to said container.

18. The interlocking container and lid according to claim 17 wherein two of the side walls are opposed first and second side walls, including first and second flaps, the first flap being attached to and extending downwardly from the upper edge of the first side wall and the second flap being attached to and extending downwardly from the upper edge of the second side wall, each container flap provided with a slot located therein, said slots dimensioned to receive therein a hand of a user for lifting said container.

19. The interlocking container and lid according to claim 18 wherein two of said side flap members on opposed side edges are each provided with a slot, said slots dimensioned to receive therein a hand of a user, said slots in said side flap members being in registration with the slots in said container flaps when said lid is attached to said container.

20. The interlocking container and lid according to claim 18 wherein said rigid container is moulded from a suitable plastic.

21. The interlocking container and lid according to claim 19 wherein said two opposed flap members are provided each with an integrally formed tear tab, said tear tabs extending a free end of the associated flap, said tear tabs being for providing a grip for pulling said flaps outwardly for removing said lid from said rigid container.

22. The interlocking container and lid according to claim 17 wherein said central portion includes fold lines substantially parallel to and spaced inwardly from said side edges.

23. The interlocking container and lid according to claim 11 wherein said central portion includes fold lines substantially parallel to and spaced inwardly from said side edges.

* * * * *